US009918192B2

(12) United States Patent
Rodriguez Montejano et al.

(10) Patent No.: US 9,918,192 B2
(45) Date of Patent: Mar. 13, 2018

(54) MOBILE MULTILATERATION SYSTEMS AND RELATED METHODS

(71) Applicant: The Boeing Company, Chicago, IL (US)

(72) Inventors: Rosa Maria Rodriguez Montejano, Madrid (ES); Pedro Taboso Ballesteros, Madrid (ES); Victor Perez Villar, Madrid (ES); Florencio Cano Serrano, Madrid (ES); David Costas, Madrid (ES); Javier Garcia, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/098,118

(22) Filed: Apr. 13, 2016

(65) Prior Publication Data

US 2016/0309291 A1    Oct. 20, 2016

(30) Foreign Application Priority Data

Apr. 20, 2015    (EP) .................... 15382189

(51) Int. Cl.
*H04W 4/02*    (2009.01)
*H04W 4/06*    (2009.01)
(Continued)

(52) U.S. Cl.
CPC .......... *H04W 4/021* (2013.01); *G01S 5/0072* (2013.01); *G01S 5/06* (2013.01); *H04B 7/18506* (2013.01);
(Continued)

(58) Field of Classification Search
CPC ... H04W 4/021; H04W 4/06; H04W 72/0446; H04B 7/18506; H04L 43/106;
(Continued)

(56) References Cited

U.S. PATENT DOCUMENTS 6,448,929 B1 * 9/2002 Smith ................. G01S 5/0081
342/32
9,311,821 B2 * 4/2016 Melum ............. H04B 7/18506
(Continued)

FOREIGN PATENT DOCUMENTS

EP    1906204    12/2009

OTHER PUBLICATIONS

Francillon et al., "Ghost in the Air (Traffic): On insecurity of ADS-B protocol and practical attacks on ADS-B devices", Network and Security Department, EURECOM, 2012, 9 pages.
(Continued)

*Primary Examiner* — Atul Trivedi
(74) *Attorney, Agent, or Firm* — Hanley, Flight & Zimmerman, LLC

(57) ABSTRACT

Mobile multilateration systems and related methods are disclosed. An example method includes accessing multilateration data relating to a first aircraft using a time-difference-of-arrival determiner of a second aircraft; processing the multilateration data at the second aircraft to determine a calculated position of the first aircraft; comparing the calculated position of the first aircraft to an asserted position of the first aircraft stored at the second aircraft; and in response to the comparison, determining if the calculated position and the asserted position are within a threshold of one another using the time-difference-of-arrival determiner of the second aircraft to determine an authenticity of the first aircraft.

21 Claims, 14 Drawing Sheets

(51) Int. Cl.
- *H04W 72/04* (2009.01)
- *H04B 7/185* (2006.01)
- *H04L 12/26* (2006.01)
- *G01S 5/00* (2006.01)
- *G01S 5/06* (2006.01)
- *G01S 5/02* (2010.01)
- *G01S 11/08* (2006.01)
- *G08G 5/00* (2006.01)

(52) U.S. Cl.
CPC ............ *H04L 43/106* (2013.01); *H04L 43/16* (2013.01); *H04W 4/06* (2013.01); *H04W 72/0446* (2013.01); *G01S 5/0289* (2013.01); *G01S 11/08* (2013.01); *G08G 5/0008* (2013.01)

(58) Field of Classification Search
CPC ..... H04L 43/16; G08G 5/0008; G01S 5/0072; G01S 5/0289; G01S 5/06; G01S 11/08
USPC .......................................................... 701/408
See application file for complete search history.

(56) References Cited

U.S. PATENT DOCUMENTS

| | | | | |
|---|---|---|---|---|
| 9,536,435 B1* | 1/2017 | Shay | ..................... | G08G 5/045 |
| 2004/0189521 A1* | 9/2004 | Smith | ..................... | G01S 13/723 342/387 |
| 2005/0007272 A1* | 1/2005 | Smith | ..................... | G01S 5/06 342/189 |
| 2006/0191326 A1* | 8/2006 | Smith | ..................... | G01H 17/00 73/73 |
| 2007/0247368 A1* | 10/2007 | Wu | ..................... | G01S 5/0221 342/465 |
| 2008/0036659 A1* | 2/2008 | Smith | ..................... | G01S 13/765 342/454 |
| 2011/0057830 A1 | 3/2011 | Sampigethaya et al. | | |
| 2012/0041620 A1 | 2/2012 | Stayton et al. | | |
| 2013/0285855 A1* | 10/2013 | Dupray | ..................... | G01S 19/48 342/451 |
| 2014/0206389 A1* | 7/2014 | Aldana | ..................... | H04W 4/021 455/456.2 |
| 2015/0350914 A1* | 12/2015 | Baxley | ..................... | H04W 12/08 726/11 |
| 2016/0155342 A1* | 6/2016 | Gibson | ..................... | G01S 5/0054 701/409 |
| 2017/0140656 A1* | 5/2017 | Mott | ..................... | G08G 5/0043 |

OTHER PUBLICATIONS

Airports Authority of India, "Security Issues of ADS-B Operations", International Civil Aviation Organization, Seminar, Hong Kong, China, Apr. 22-25, 2014, 3 pages.

Sampigethaya et al., "Assessment and Mitigation of Cyber Exploits in Future Aircraft Surveillance", IEEE, 2010, 10 pages.

European Patent Office, "Extended European Search Report", issued in connection with European Patent Application No. 15382189.7, dated Oct. 13, 2015, 10 pages.

Neven et al., "Wide Area Multilateration Report on EATMP TRS 131/04 Version 1.1", National Aerospace Laboratory NLR, Aug. 2005, [https://www.eurocontrol.int/sites/default/files/publication/files/surveilllance-report-wide-area-multilateration-200508.pdf], retrieved on Apr. 13, 2016, 94 pages.

International Civil Aviation Organization, "Manual on the Secondary Surveillance Radar (SSR) Systems", Jul. 14, 2006, [http://eaulib.eau.ac.th/Documents%202006_7/Doc%209684x%20-%20%20Manual%20on%20the%20Secondary%20Surveillance%20Radar%20%28SSR%29%20System%20Ed3%20-%2004_OCR.pdf], retrieved on Apr. 13, 2016, 246 pages.

European Organisation for the Safety of Air Navigation, "ADS-B for Dummies", Dec. 5, 2007, [www.ssd.dhmi.gov.tr/getBinaryFile.aspx?Type=3&dosyaID=195], retrieved on Apr. 13, 2016, 25 pages.

Avidyne Corporation, "ADS-B Overview", Sep. 2012, [http://www.nafcflying.org/docs/ADS-B-Overview.pdf], retrieved on Apr. 13, 2016, 24 pages.

* cited by examiner

| Aircraft ID | ADS-B Position | Timestamp | Enough Data for AMLAT? |
|---|---|---|---|
| 802 $Id_2$ | $(x_2, y_2, z_2)$ | $TS_1^2$ $TS_3^2$ $TS_4^2$ $TS_5^2$ | Yes |
| 804 $Id_3$ | $(x_3, y_3, z_3)$ | $TS_1^3$ $TS_2^3$ $TS_4^3$ $TS_5^3$ | Yes |
| 806 $Id_4$ | $(x_4, y_4, z_4)$ | $TS_1^4$ $TS_2^4$ | No |
| 808 $Id_5$ | $(x_5, y_5, z_5)$ | $TS_1^5$ $TS_2^5$ $TS_3^5$ $TS_4^5$ | Yes |

810 Aircraft ID, 812 ADS-B Position, 814 Timestamp, 816 Enough Data for AMLAT?; table 800 TWn $TS_B^A$: Time of Arrival Registered by Aircraft B Regarding an ADS-B Message Sent by Aircraft A

| | | TWn | |
|---|---|---|---|
| 1410 | 1412 | 1414 | 1416 |
| Aircraft ID | ADS-B Position | Timestamp | Verified |
| $Id_2$<br>1402 | $(x_2, y_2, z_2)$ | $TS_1^2$<br>$TS_3^2$<br>$TS_4^2$<br>$TS_5^2$ | ✓<br>Yes<br>Truthful |
| $Id_3$<br>1404 | $(x_3, y_3, z_3)$ | $TS_1^3$<br>$TS_2^3$<br>$TS_4^3$<br>$TS_5^3$ | ✓<br>Yes<br>Truthful |
| $Id_4$<br>1406 | $(x_4, y_4, z_4)$ | $TS_1^4$<br>$TS_2^4$ | ?<br>No |
| $Id_5$<br>1408 | $(x_5, y_5, z_5)$ | $TS_1^5$<br>$TS_2^5$<br>$TS_3^5$<br>$TS_4^5$ | ✗<br>Yes<br>Untruthful |

FIG. 14

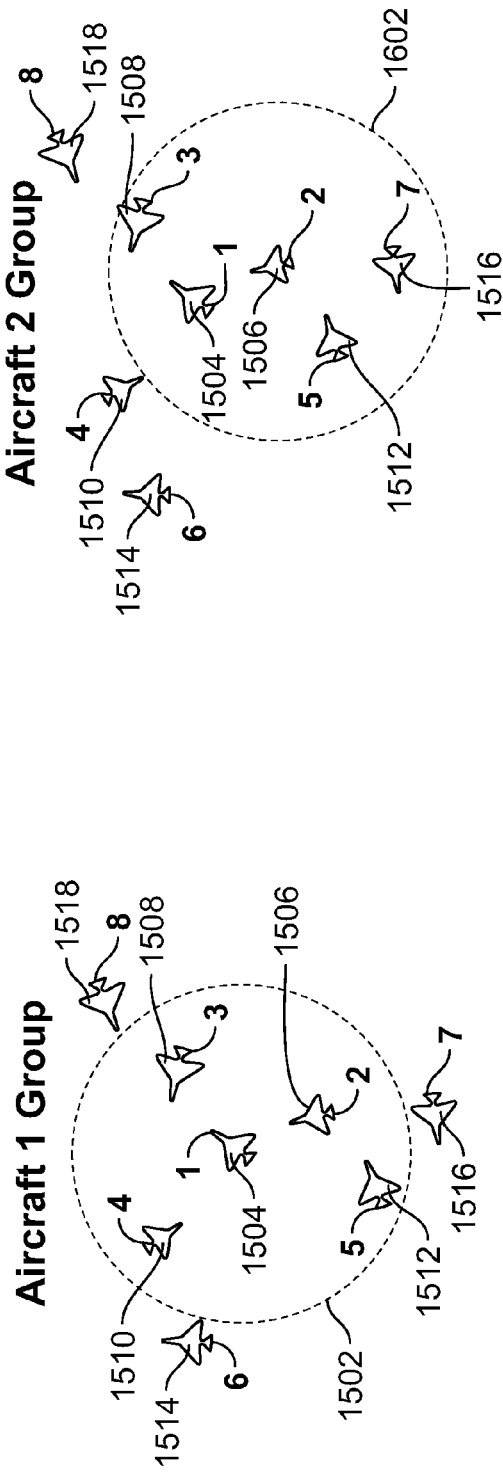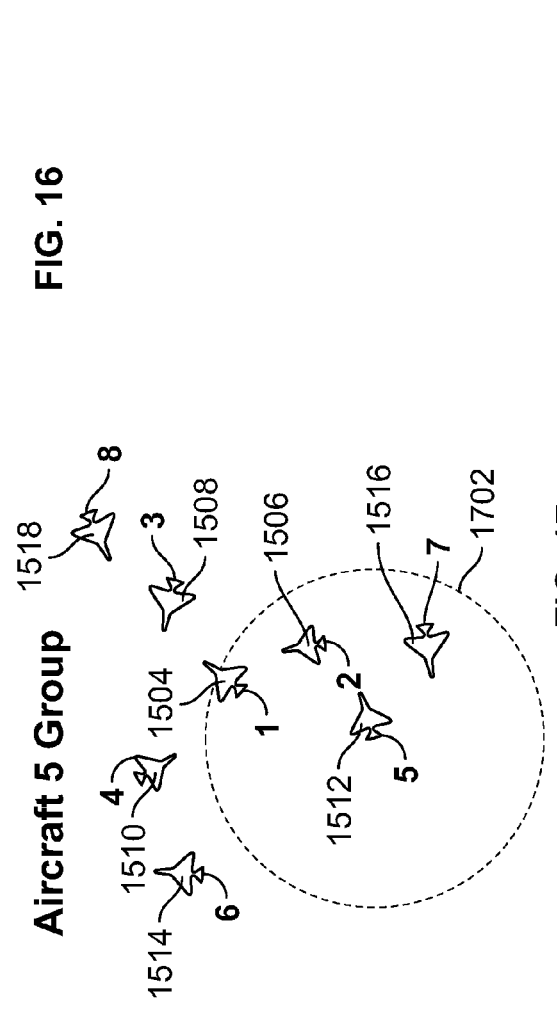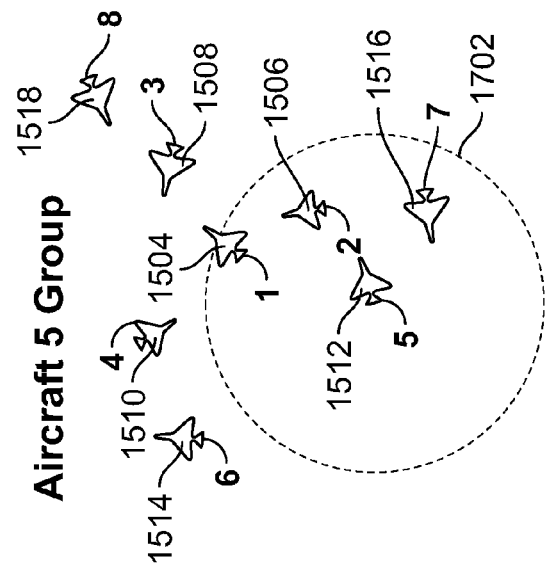

MOBILE MULTILATERATION SYSTEMS AND RELATED METHODS

RELATED APPLICATION

This patent claims priority to European Patent Application No. EP15382189.7, which was filed on Apr. 20, 2015. European Patent Application No. EP15382189.7 is hereby incorporated herein by reference in its entirety.

BACKGROUND

Multilateration ground stations may be employed around airports to determine the location of an aircraft.

BRIEF DESCRIPTION OF THE DRAWINGS

FIG. 8 is an example table including data obtained using the examples disclosed herein.

FIG. 14 is an example table including data obtained using the examples disclosed herein.

FIG. 15 illustrates an example range of an example first aircraft.

FIG. 16 illustrates an example range of an example aircraft.

FIG. 17 illustrates an example range of another example aircraft.

The figures are not to scale. Wherever possible, the same reference numbers will be used throughout the drawing(s) and accompanying written description to refer to the same or like parts.

DETAILED DESCRIPTION

Figure 1:
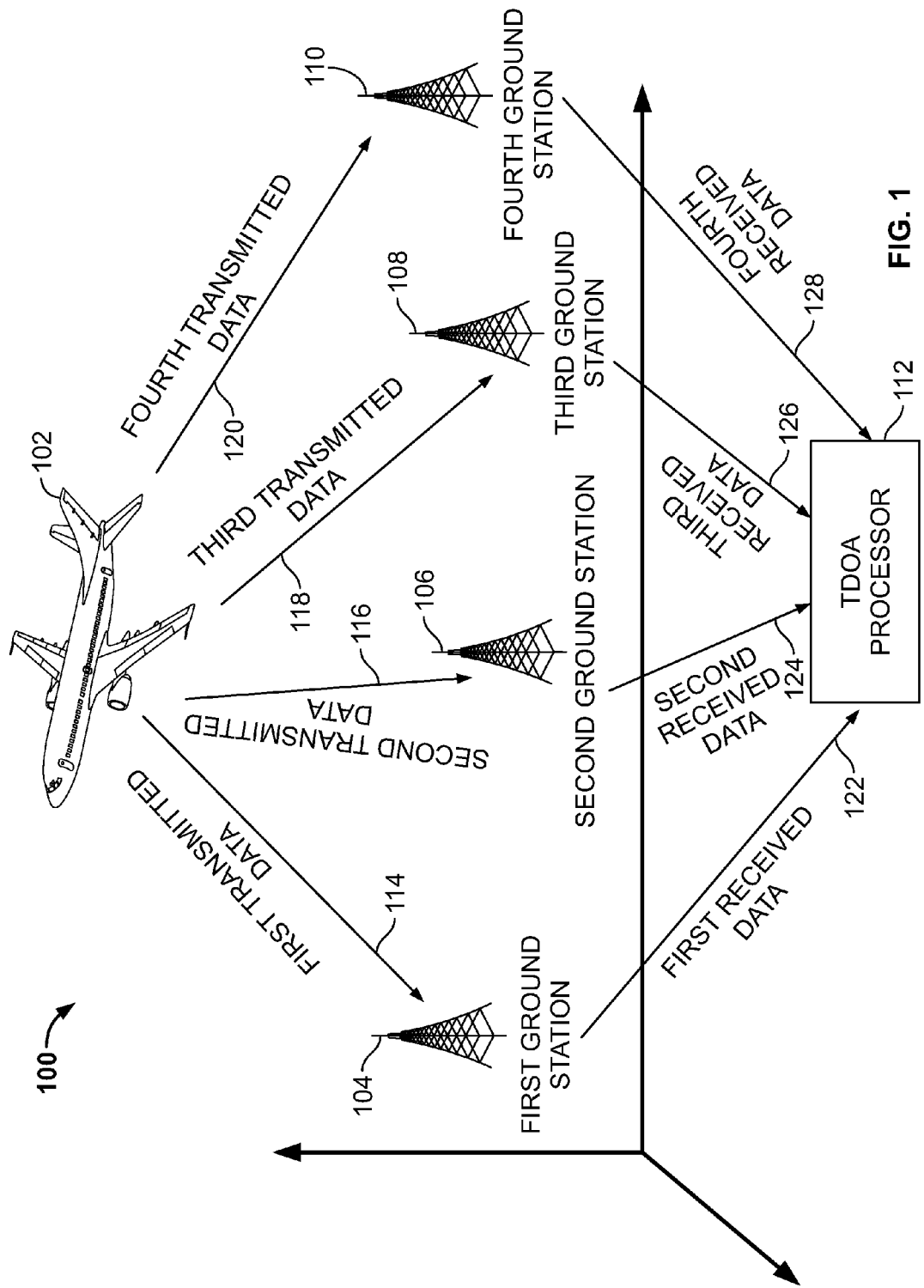
FIG. 1 illustrates an example ground-based multilateration system.

FIG. 1 illustrates an example ground based multilateration (MLAT) system 100 that includes an aircraft 102, a first ground station 104, a second ground station 106, a third ground station 108, a fourth ground station 110 and a time difference of arrival (TDOA) processor and/or processor 112. In some examples, the MLAT system 100 is a cooperative surveillance application that accurately establishes the position of the aircraft 102. In some examples, the aircraft 102 receives Mode S inquiries and/or Automatic Dependent Surveillance-Broadcast (ADS-B) inquiries. In response to these requests, the aircraft 102 transmits a response including first transmitted data 114, second transmitted data 116, third transmitted data 118 and fourth transmitted data 120.

In some examples, the first transmitted data 114 is received at the first ground station 104 at a first time ($T_1$), the second transmitted data 116 is received at the second ground station 106 at a second time ($T_2$), the third transmitted data 118 is received at the third ground station 108 at a third time ($T_3$) and the fourth transmitted data 120 is received at the fourth ground station 110 at a fourth time ($T_4$) where the first time, the second time, the third time and the fourth time are different (e.g., fractionally different) from one another.

To determine the position of the aircraft 102, the TDOA processor 112 accesses first received data 122 from the first ground station 104, second received data 124 from the second ground station 124, third received data 126 from the third ground station 108 and fourth received data 128 from the fourth ground station 110. Using, for example, Equation 1, the TDOA processor 112 processes the first, second, third and fourth received data 122, 124, 126, 128 to determine the location of the aircraft 102. However, in other examples, the TDOA processor 112 may include additional and/or fewer data points.

Referring to Equation 1, $d_i$ refers to the distance between the aircraft 102 and one of the first, second, third and/or forth ground stations 104, 106, 108, 110; $x_i$ refers to the known x-location of the selected ground station 104, 106, 108, 110; $y_i$ refers to the known y-location of the selected ground station 104, 106, 108, 110; $z_i$ refers to the known z-location of the selected ground station 104, 106, 108, 110. Further, referring to Equation 1, the x in Equation 1 refers to the x-axis data from the aircraft 102 included in one or more of the first received data 122, the second received data 124, the third received data 126 and/or the fourth received data 128; the y in Equation 1 refers to the y-axis data from the aircraft 102 included one or more of the first received data 122, the second received data 124, the third received data 126 and/or the fourth received data 128; and the z in Equation 1 refers to the z-axis data from the aircraft 102 included one or more of the first received data 122, the second received data 124, the third received data 126 and/or the fourth received data 128.

$$d_i = \sqrt{(x_i-x)^2+(y_i-y)^2+(z_i-z)^2} \qquad \text{Equation 1:}$$

Equation 2 may be used to determine a time difference of arrival (TDOA) between a first time of arrival ($TOA_i$) of the first transmitted data 114, the second transmitted data 116, the third transmitted data 118 and/or the fourth transmitted data 120 and a second time of arrival ($TOA_m$) of the first transmitted data 114, the second transmitted data 116, the third transmitted data 118 and/or the fourth transmitted data 120.

$$TDOA_{i-m} = TOA_i - TOA_m \quad \text{Equation 2:}$$

Equation 3 is based on Equations 1 and 2 and the speed of light (c).

$$c \cdot TDOA_{i-m} = d_i - d_m \quad \text{Equation 3:}$$

Figure 2:
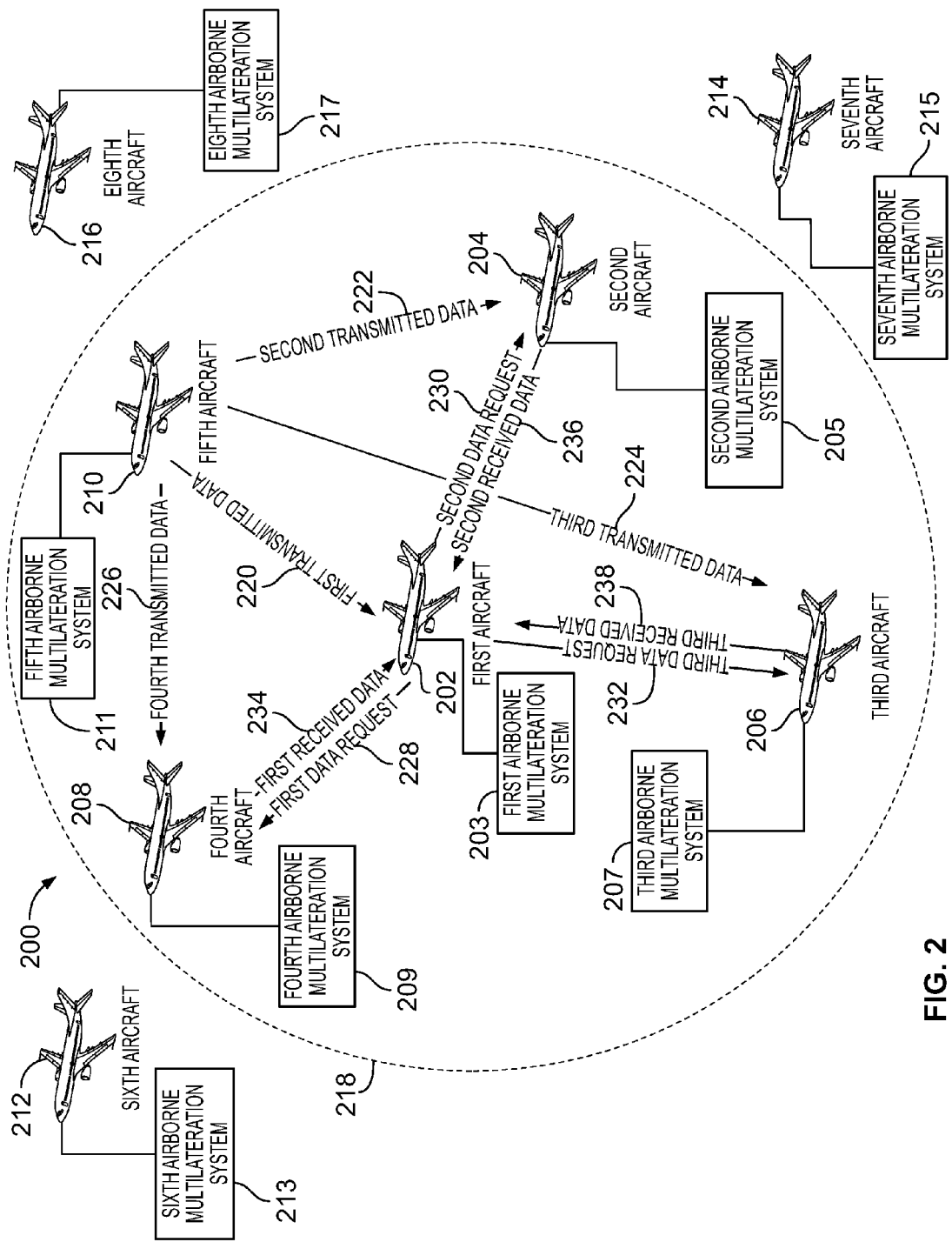
FIG. 2 illustrates example aircraft including example airborne multilateration systems in accordance with the teachings of this disclosure.

FIG. 2 illustrates an example airborne multilateration (AMLAT) system 200 including an example first aircraft 202 including an example first airborne multilateration (AMLAT) system 203, an example second aircraft 204 including an example second airborne multilateration system (AMLAT) 205, an example third aircraft 206 including an example third airborne multilateration (AMLAT) system 207, an example fourth aircraft 208 including an example fourth airborne multilateration (AMLAT) system 209, an example fifth aircraft 210 including an example fifth airborne multilateration (AMLAT) system 211, an example sixth aircraft 212 including an example sixth airborne multilateration (AMLAT) system 213, an example seventh aircraft 214 including an example seventh airborne multilateration system (AMLAT) 215 and an example eighth aircraft 216 including an example eighth airborne (AMLAT) multilateration system 217.

As illustrated in the example of FIG. 2, the first AMLAT system 203 of the first aircraft 202 includes a range 218 in which the first aircraft 202 can exchange data with other aircraft. In the example of FIG. 2, the range 218 of the first aircraft 202 includes the second aircraft 204, the third aircraft 206, the fourth aircraft 208 and the fifth aircraft 210 but excludes the sixth aircraft 212, the seventh aircraft 214 and the eighth aircraft 216. While the range 218 may be any suitable distance, in some examples, the range 218 may be 120 nautical miles if the ADS-B range is based on 1090-ES, for example.

In some examples, the aircrafts 202, 204, 206, 208, 210, 212, 214, 216 include the example AMLAT systems 203, 205, 207, 209, 211, 213, 215 and/or Automatic Dependent Surveillance-Broadcast (ADS-B) systems to enable each of the aircraft 202, 204, 206, 208, 210, 212, 214, 216 to broadcast and/or transmit requests, data and/or messages and/or receive such requests, data and/or messages including the identity of the aircraft 202, 204, 206, 208, 210, 212, 214, 216 (e.g., the aircraft ID) and the position of the respective aircraft 202, 204, 206, 208, 210, 212, 214, 216.

In the illustrated example, the fifth AMLAT system 211 of the fifth aircraft 210 is transmitting first transmitted data 220 that is received by the first AMLAT system 203 of the first aircraft 202, second transmitted data 222 that is received by the second AMLAT system 205 of the second aircraft 204, third transmitted data 224 that is received by the third AMLAT system 207 of the third aircraft 206 and fourth transmitted data 226 that is received by the fourth AMLAT system 209 of the fourth aircraft 208. In some examples, each of the first, second, third and fourth transmitted data 220, 222, 224, 226 includes the aircraft ID of the fifth aircraft 210 and positional information of the fifth aircraft 210. While the example of FIG. 2 illustrates the first, second, third and fourth transmitted data 220, 222, 224, 226 as being separately transmitted data, the first, second, third and fourth transmitted data 220, 222, 224, 226 may be the same message and/or ADS-B message that are received at the second, third and fourth AMLAT systems 203, 205, 207, 209 at different times. In some examples, the first, second, third and fourth transmitted data 220, 222, 224 and 226 are transmitted within the same time window ($T_n$).

In some examples, given that the aircraft 202, 204, 206, 208, 210 are spaced from one another, the length of the time window enables each of the first, second, third and fourth AMLAT systems 203, 205, 207, 209 of the respective first, second, third and fourth aircraft 202, 204, 206, 208 and 210 to receive the same message and/or data transmitted from the fifth AMLAT system 211 at different times within the time window. In some examples, the length of the time window enables each of the first, second, third, fourth, fifth, sixth, seventh and eighth AMLAT systems 203, 205, 207, 209, 211, 213, 215, 217 to receive the same message from the others of the first, second, third, fourth, fifth, sixth, seventh and eighth AMLAT systems 203, 205, 207, 209, 211, 213, 215, 217. While the length of the time window may vary depending on the particular application, in some example, the time window is approximately 500 milliseconds (ms) and is repeated every 10 seconds (time window period) starting on the first seconds of each minute.

Upon receipt of the first transmitted data 220, the first AMLAT system 203 time stamps the first transmitted data 220 to form first multilateration data including the aircraft ID of the fifth aircraft 210, the positional information of the fifth aircraft 210, the time of arrival (TOA) of the first transmitted data 220 and a time window ID that identifies the time window in which the first transmitted data 220 was received. Similarly, upon receipt of the second, third and fourth transmitted data 222, 224, 226 at the respective second, third and fourth AMLAT systems 205, 207, 209, 211, the second AMLAT system 205 time stamps the second transmitted data 222 to form second multilateration data, the third AMLAT system 207 time stamps the third transmitted data 224 to form third multilateration data and the fourth AMLAT system 209 time stamps the fourth transmitted data 226 to form fourth multilateration data.

To verify the authenticity of the fifth aircraft 210 and/or the authenticity of the first transmitted data 220, the first AMLAT system 203 determines if sufficient data is available to perform such an authentication of the fifth aircraft 210. If sufficient data is not available to determine the authenticity of the fifth aircraft 210, the first AMLAT system 203 broadcasts and/or transmits a first data request 228 to the fourth AMLAT system 209, a second data request 230 to the second AMLAT system 205 and a third data request 232 to the third AMLAT system 207. In some examples, each of the first, second and third requests 228, 230, 232 includes a request to transmit airborne multilateration (AMLAT) data for a time window. The requested AMLAT data may include the ID of the aircraft (e.g., the fifth aircraft 210) and the time stamp of the data from the aircraft (e.g., the fifth aircraft 210).

While the example of FIG. 2 illustrates the first, second, third data requests 228, 230, 232 as being separately transmitted data, the first, second, third data requests 228, 230, 232 may be the same broadcast that is not specifically addressed to a particular one of the second, third and/or fourth aircraft 204, 206, 208 and/or the associated second, third and/or fourth AMLAT systems 205, 207, 209. Thus, in some examples, the first, second and third data requests 228, 230, 232 may be the same broadcast that is received at the second, third and fourth AMLAT systems 205, 207, 209, 211 at different times that generally requests copies of available AMLAT data stored at the respective aircraft 204, 206, 208, 210 and received from the others of the aircraft 202, 204, 206, 208, 210, 212, 214, 216. In some examples, the first, second, third data requests 228, 230, 232 are sent via a Mode S transponder data link using a 1030 megahertz (MHz) frequency.

In the illustrated example, the receiving of the first data request 228 triggers the fourth AMLAT system 209 to transmit first received data 234 to the first AMLAT system 203. Similarly, the receiving of the second and third data requests 230, 232 triggers the second AMLAT system 205 to transmit second received data 236 and triggers the third AMLAT system 207 to transmit third received data 238. In some examples, each of the first received data 234, the second received data 236 and the third received data 238 includes the ID of the aircraft (e.g., the fifth aircraft 210), the positional information of the aircraft (e.g., the fifth aircraft 210), the time stamp of the data from the aircraft (e.g., the fifth aircraft 210) and/or a time stamp window ID. In some examples, the first, second and third received data 234, 236, 238 includes copies of available AMLAT data stored at the respective aircraft 206, 208, 210 including, for example, AMLAT data associated with one or more of the first, second, third, fourth, fifth, sixth, seventh and/or eighth aircraft 202, 204, 206, 208, 210, 212, 214, 216. In some examples, the first, second and third received data 234, 236, 238 are sent via a Mode S transponder data link using 10980 MHz frequency and includes a single ADS-B message received during the time window requested.

In some examples, to avoid collision of the first received data 234, the second received data 236 and the third received data 238 and/or to avoid a collision of the first, second and third data requests 228, 230, 232 with requests from other aircraft, each of the second AMLAT system 205, the third AMLAT 207 and the fourth AMLAT 208 (e.g., the aircraft 202, 204, 206, 208, 210 within the range 218) include a self-assigned response time slot and/or a random interval response delay. Thus, the first received data 234, the second received data 236 and/or the third received data 238 are not transmitted simultaneously and/or negatively impact the transmission of another of the first received data 234, the second received data 236 and/or the third received data 238 and/or the first, second and third data requests 228, 230, 232 are not transmitted at the same time as a request from another aircraft.

In some examples, as the first AMLAT system 203 receives the first transmitted data 220, the first received data 234, the second received data 236 and/or the third received data 236, the first AMLAT system 203 determines if a threshold has been satisfied for the first time window to verify the authenticity of the fifth aircraft 210. In some examples, the threshold amount of data is satisfied when the first AMLAT system 203 obtains four timestamps and associated data on the fifth aircraft 210 within the first time window.

In some examples, if the first AMLAT system 203 determines that the threshold amount of data has been satisfied, the first AMLAT system 203 performs multilateration calculations to determine a calculated position of the fifth aircraft 210 using the first multilateration data associated with the first transmitted data 220, the second multilateration data of the second received data 236, the third multilateration data of the third received data 238 and the fourth multilateration data of the first received data 234. In some examples, to determine the authenticity of the fifth aircraft 210, the first AMLAT system 203 compares the calculated position of the fifth aircraft 210 to an asserted position of the fifth aircraft 210 included in the first, second, third and/or fourth transmitted data 220, 222, 224, 226 from 210. In some examples, the first AMLST system 203 determines that the fifth aircraft 210 is authentic when the calculated and asserted positions of the fifth aircraft 210 satisfy a threshold. In some examples, the first AMLAT system 203 determines that the fifth aircraft 210 is not authentic when the calculated and asserted positions of the fifth aircraft 210 do not satisfy the threshold. If the calculated and asserted positions of the fifth aircraft 210 do not satisfy a threshold, the fifth aircraft 210 may be considered malicious and/or untruthful.

Figure 3:
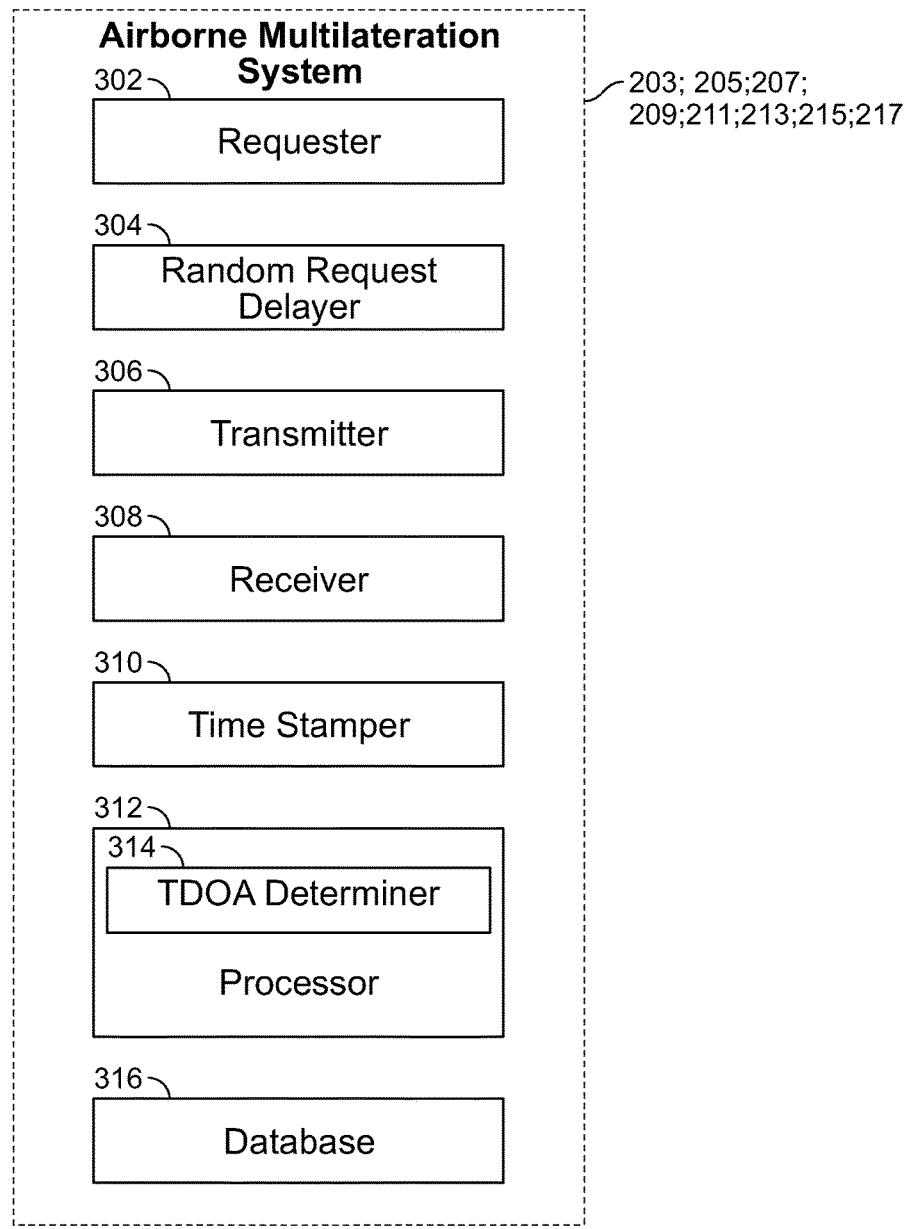
FIG. 3 is a schematic illustration of an example airborne multilateration system that can be used to implement the example airborne multilateration systems of FIG. 2.

FIG. 3 illustrates an example airborne multilateration (AMLAT) system that can be used to implement the first AMLAT system 203, the second AMLAT system 205, the third AMLAT system 207, the fourth AMLAT system 209, the fifth AMLAT system 211, the sixth AMLAT system 213, the seventh AMLAT system 215 and the eighth AMLAT system 217. In the example of FIG. 3, the AMLAT system includes an example requester 302, an example random request delayer 304, an example transmitter 306, an example receiver 308, an example time stamper 310, an example processor 312 including an example time difference of arrival (TDOA) determiner 314 and an example database 316.

In operation, in some examples, the transmitter 306 of the fifth AMLAT system 211 transmits data including the aircraft ID and positional information that is received by the receiver 308 and time stamped by the time stamper 310 of the first, second, third and fourth AMLAT systems 203, 205, 207, 209, 211 of the surrounding aircraft to form multilateration data. In some examples, the multilateration data for a time window and associated with different aircraft is stored within the database 316 that is accessible by, for example, the processor 312.

In some examples, when the first AMLAT system 203 of the first aircraft 202 has determined to verify the authenticity of the fifth aircraft 210, for example, the processor 312 determines if the database 316 includes a threshold amount of data obtained within a first time window relating to the fifth aircraft 210 to perform such an authentication process. If the processor 312 determines that the database 316 does not include the threshold amount of data to determine the authenticity of the fifth aircraft 210, the processor 312 may cause the requester 302 of the first aircraft 202 to broadcast and/or transmit a data request to the aircraft 204, 206, 208, 210 within the range 218 of the first aircraft 202. In some examples, the data request includes a request for AMLAT data including, for example, an aircraft ID, positional information received, time stamp information associated with the positional information/aircraft ID and/or time window information. In some examples, prior to the requester 302 broadcasting the data request, the random request delayer 304 may cause the requester 302 to delay the broadcasting of the data request until a time period has lapsed to substantially ensure that requests from different aircraft are not simultaneously submitted.

In some examples, the data request sent by the requester 302 of the first AMLAT system 203 is received by the receiver 308 of the second AMLAT system 205 and processed by the processor 312 of the second AMLAT system 205. In some examples, the request causes the processor 312 to access airborne multilateration (AMLAT) data from the database 316 and for the transmitter 306 to transmit the data including, for example, the aircraft ID, the positional data, the time stamp of the data from the aircraft (e.g., the fifth aircraft 210) and/or a time stamp window ID. Similarly, upon receipt of the data request sent by the requester 302 of the first AMLT system 203, the third, fourth and fifth AMLAT systems 207, 209, 211 access and transmit stored AMLAT data from the respective databases 316. The data transmitted by the transmitter 306 of the second aircraft 205 is receivable by the receiver 308 of the first aircraft 202.

When the processor 312 determines that the database 316 of the first AMLAT system 203 includes the threshold amount of data to determine the authenticity of the fifth aircraft 210, the TDOA determiner 314 of the first AMLAT system 203 uses multilateration data from the database 316 to determine a calculated position of the fifth aircraft 210. In some examples, to determine the authenticity of the fifth aircraft 210, the processor 312 of the first AMLAT system 203 compares the calculated position of the fifth aircraft 210 to an asserted position of the fifth aircraft 210 obtained. In some examples, the processor 312 of the first AMLAT system 203 determines that the fifth aircraft 210 is authentic when the calculated and asserted positions of the fifth aircraft 210 satisfy a threshold. In some examples, the processor 312 of the first AMLAT system 203 determines that the fifth aircraft 210 is not authentic when the calculated and asserted positions of the fifth aircraft 210 do not satisfy a threshold. If the calculated and asserted positions of the fifth aircraft 210 do not satisfy a threshold, the fifth aircraft 210 may be considered malicious and/or untruthful.

While an example manner of implementing the airborne multilateration systems 203, 205, 207, 209, 211, 213, 215, 217 of FIG. 2 is illustrated in FIG. 3, one or more of the elements, processes and/or devices illustrated in FIG. 3 may be combined, divided, re-arranged, omitted, eliminated and/or implemented in any other way. Further, the example requester 302, the example random request delayer 304, the example transmitter 306, the example receiver 308, the example time stamper 310, the example processor 312, the example TDOA determiner 314, the example database 316 and/or, more generally, the example airborne multilateration system of FIG. 3 may be implemented by hardware, software, firmware and/or any combination of hardware, software and/or firmware. Thus, for example, any of the example requester 302, the example random request delayer 304, the example transmitter 306, the example receiver 308, the example time stamper 310, the example processor 312, the example TDOA determiner 314, the example database 316 and/or, more generally, the example airborne multilateration system of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example requester 302, the example random request delayer 304, the example transmitter 306, the example receiver 308, the example time stamper 310, the example processor 312, the example TDOA determiner 314, the example database 316 and/or, more generally, the example airborne multilateration system of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example multilateration system of FIG. 2 may include one or more elements, processes and/or devices in addition to, or instead of, those illustrated in FIG. 3, and/or may include more than one of any or all of the illustrated elements, processes and devices.

Figure 4:
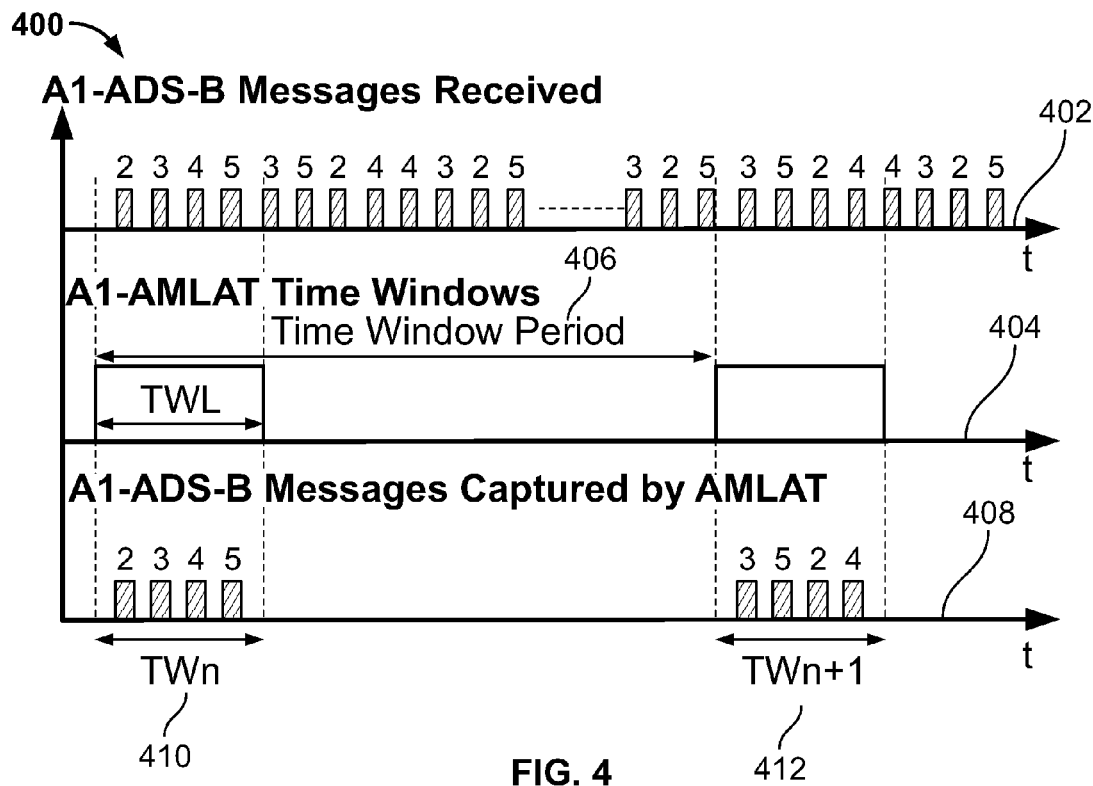
FIG. 4 is an example graph of results obtained using the examples disclosed herein including messages received at an example aircraft during different time windows and/or periods.

FIG. 4 illustrates a graph 400 displaying data received at the first aircraft 202 from the second, third, fourth and fifth aircraft 202, 204, 206, 210 and transmitted from the second aircraft 204 represented by the reference number 2, data transmitted from the third aircraft 206 is represented by reference number 3, data transmitted from the fourth aircraft 208 is represented by reference number 4 and data transmitted from the fifth aircraft 210 is represented by reference number 5. A first x-axis 402 represents time and includes messages (e.g., ADS-B messages) and/or data received at the first aircraft 202. A second x-axis 404 represents time and includes a time window period 406 within which the first aircraft 202 is receiving data from the other aircraft 204, 206, 208, 210 within the group defined by the range 218. A third axis 408 represents time and includes the messages and/or data obtained within a first time window, $TW_n$, 410. In this example, the first time window 410 includes data relating to each of the second aircraft 204, the third aircraft 206, the fourth aircraft 208 and the fifth aircraft 210. Similarly, in the illustrated example, a second time window, $TW_{n+1}$, 412 includes data relating to each of the second aircraft 204, the third aircraft 206, the fourth aircraft 208 and the fifth aircraft 210. In some examples, the time windows 410, 412 are 500 milliseconds (ms) long and are repeated periodically within the time period 406 starting at the first seconds of each minute. In the illustrated example, the first aircraft 202 is listening for and/or receiving messages from the second, third, fourth and fifth aircraft 204, 206, 208, 210 within the range 218 for 500 ms every 10 seconds.

Figure 5:
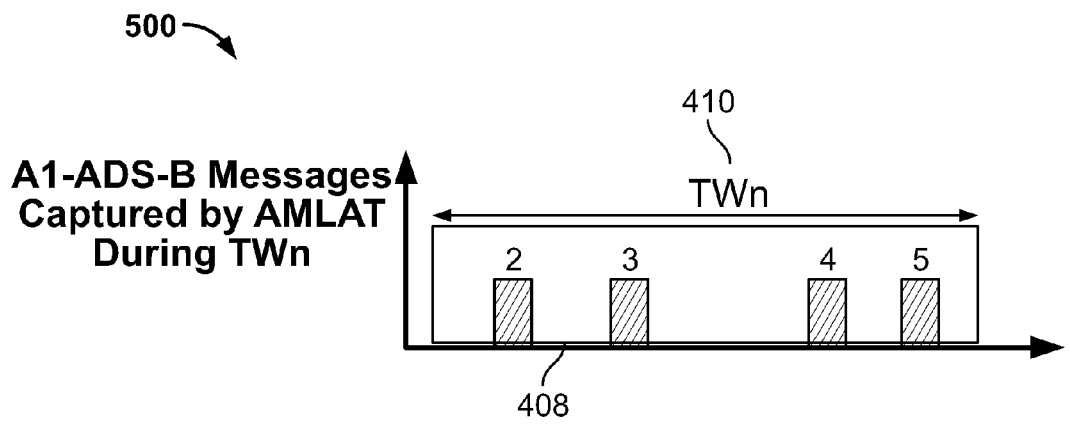
FIG. 5 is a portion of the example graph of FIG. 4.

FIG. 5 illustrates a graph 500 of the messages and/or data received by the first aircraft 202 within the first time window 406.

Figure 6:
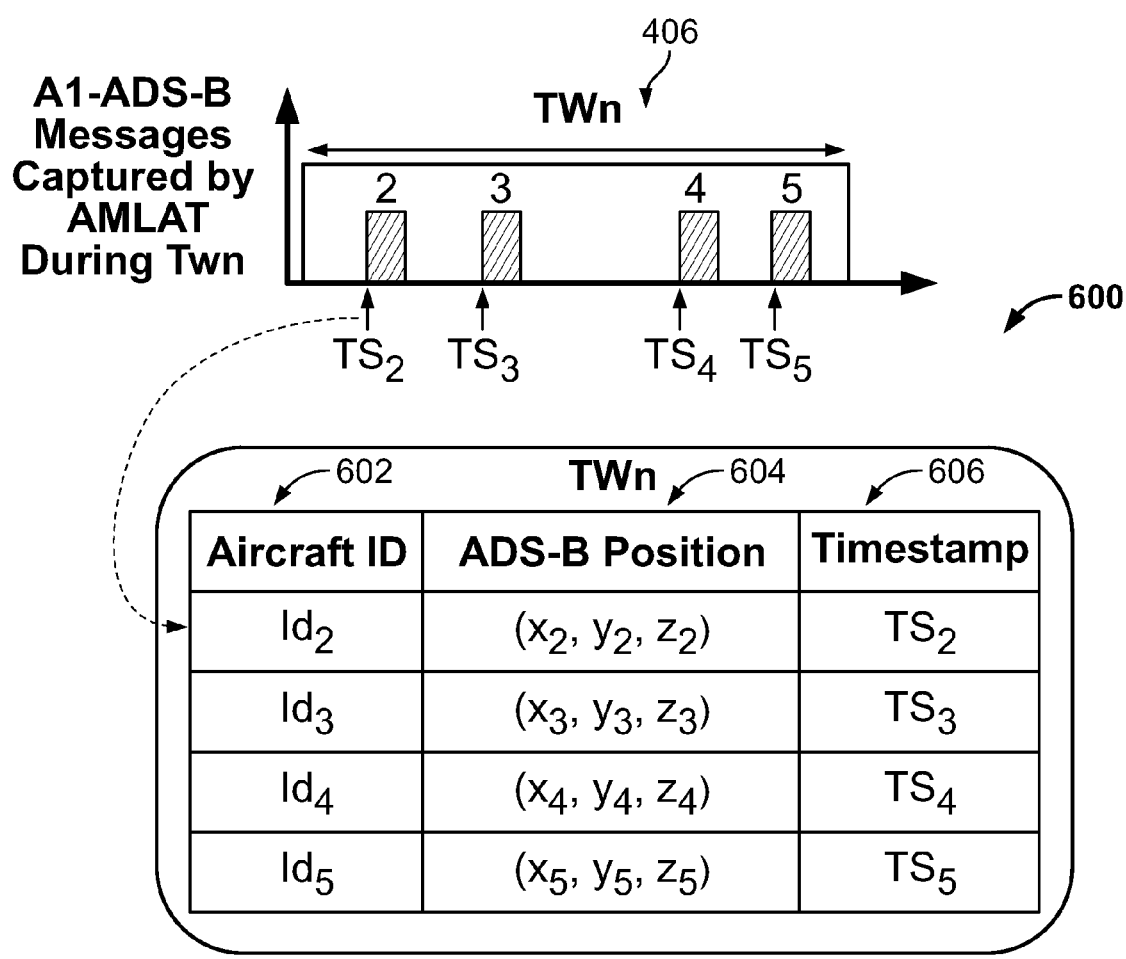
FIG. 6 is an example graph and an example table including data obtained using the examples disclosed herein.

FIG. 6 illustrates a table 600 of multilateration data including an aircraft ID column 602, a ADS-B position column 604 and a timestamp column 606. In this example, data populating the aircraft ID column 602 and the ADS-B position column 604 may be extracted from the data received by the first aircraft 202 from the second, third, fourth and fifth aircraft 202, 204, 206, 208, 210. In this example, the data populating the time stamp column 606 includes the time, $TS_2$; $TS_3$; $TS_4$; $TS_5$, that the message was received at the first aircraft 202. In some examples, the table 600 may be stored in a memory for a particular time period and/or may be overwritten and/or deleted once the time period has lapsed.

Figure 7:
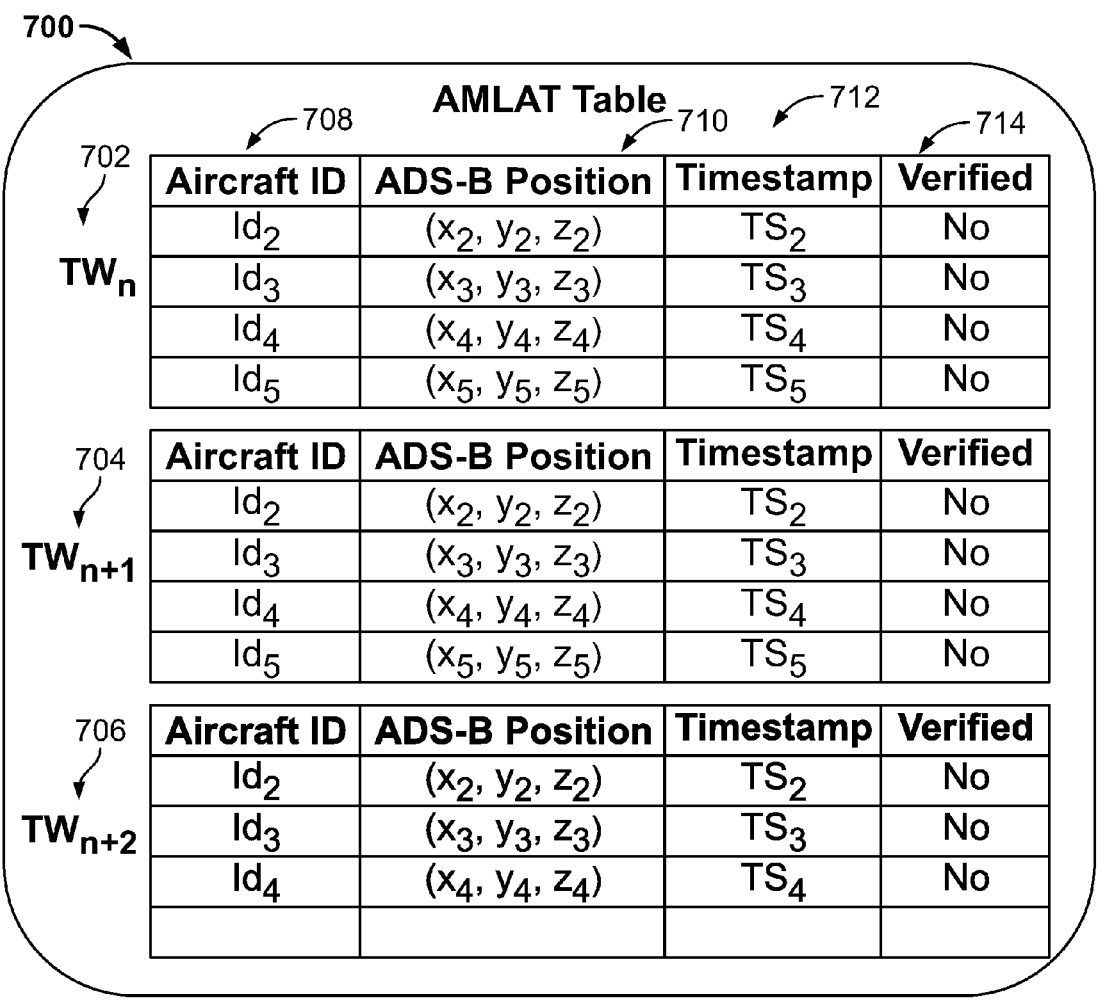
FIG. 7 is an example table including data obtained using the examples disclosed herein.

FIG. 7 illustrates a table 700 of airborne multilateration data received by the first aircraft 202 within a first time window 702, a second time window 704 and a third time window 706. The table 700 includes a first column 708 including an aircraft ID, a second column 710 including positional information, a third column 712 including a timestamp and a fourth column 714 indicating whether or not the information within the corresponding first, second and/or third columns 708, 710, 712 has been verified. In the table 700, the subscript 2 corresponds to the data relating to the second aircraft 206, the subscript 3 corresponds to the data relating to the third aircraft 208 and the subscript 4 corresponds to the data relating to the fourth aircraft 210.

Because the aircraft within the range 218 of the first aircraft 202 changes with time, the first and second time windows 702, 704 include multilateration data from the second aircraft 204, the third aircraft 206, the fourth aircraft 208 and the fifth aircraft 210 and the third time window 706 includes multilateration data from the second aircraft 204, the third aircraft 206, the fourth aircraft 208 but does not include multilateration data from the fifth aircraft 210. In the example table 700 of FIG. 7, the fourth column 614 indicates that none of the corresponding aircraft 204, 206, 208, 210 have been verified because the first AMLAT system 203 has not yet obtained a sufficient number of time stamps (e.g., four time stamps) for each of the first, second and third time windows 702, 704, 706 for the different aircraft 204, 206, 208, 210.

FIG. 8 illustrates a table 800 including first multilateration data 802 relating to the second aircraft 204, second multilateration data 804 relating to the third aircraft 206, third multilateration data 806 relating to the fourth aircraft 208 and fourth multilateration data 808 relating to the fifth aircraft 210. The example table 800 includes a first column 810 including an aircraft ID, a second column 812 including positional information, a third column 814 including a timestamp and a fourth column 816 indicating whether or not sufficient information is available to verify the authenticity of the associated aircraft. In the illustrated example, sufficient information is available to verify the authenticity of the associated aircraft when data relating to four time stamps is present. Thus, as illustrated in the table 800, there is sufficient information for the first aircraft 202 to verify the authenticity of the second aircraft 204, the third aircraft 206 and the fifth aircraft 210 but there is not sufficient information for the first aircraft 202 to verify the authenticity of the fourth aircraft 208.

Figure 9:
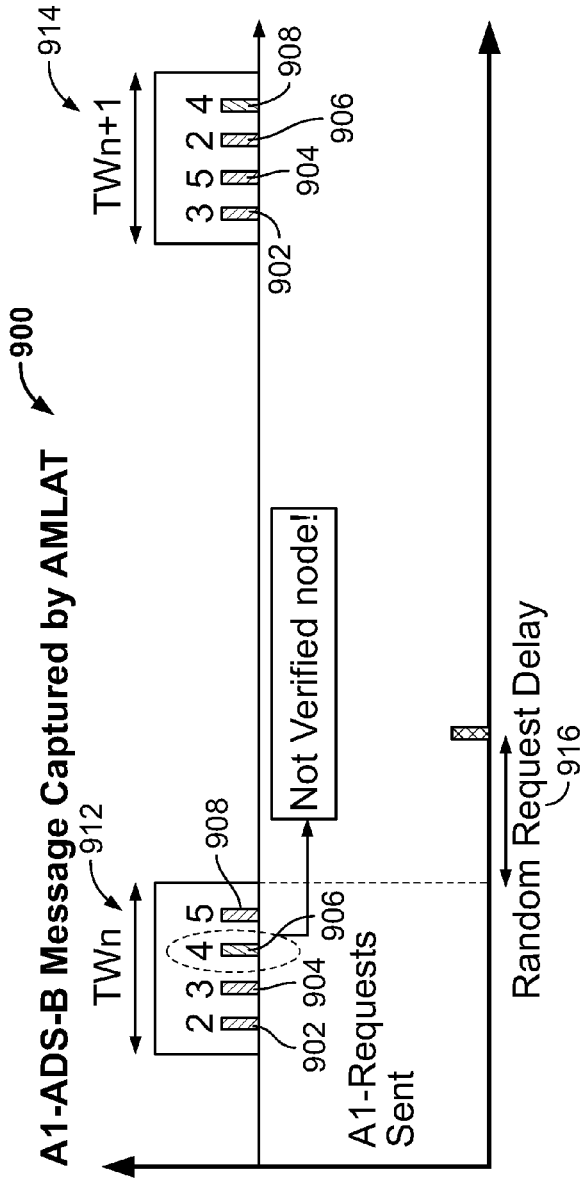
FIG. 9 illustrates an example graph including data obtained using the examples disclosed herein.

FIG. 9 is an example graph 900 including a first indication 902 indicating that the second aircraft 204 has been verified by the first aircraft 202, a second indication 904 indicating that the third aircraft 206 has been verified by the first aircraft 202, a third indication 906 indicating that the fourth aircraft 208 has not yet been verified by the first aircraft 202 and a fourth indication 908 indicating that the fifth aircraft 910 has been verified by the first aircraft 202 for a first time window, $TW_n$, 912. Because the first aircraft 202 has not verified the fourth aircraft 908 and/or because the first aircraft 202 does not have sufficient data to verify the fourth aircraft 908, the first aircraft 202 broadcasts and/or sends a data request for information obtained within a second time period 914. In some examples, the first aircraft 202 waits for a random request delay period 916 prior to sending the request for the information within the second time period 914 to deter the request sent by the first aircraft 202 from interfering with a request sent by another one of the other aircraft 204, 206, 208, 210. In some examples, the random request delay period is one second. However, the random request delay period may be any length of time.

Figure 10:
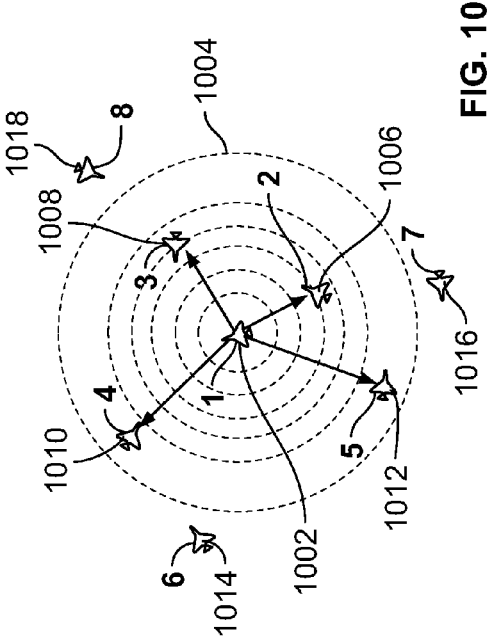
FIG. 10 illustrates an example first aircraft broadcasting example requests for multilateration data to aircraft within a range of the first aircraft.

FIG. 10 illustrates a first aircraft 1002 broadcasting a request within a range 1004 of the first aircraft 1002 where the range 1004 includes a second aircraft 1006, a third aircraft 1008, a fourth aircraft 1010 and a fifth aircraft 1012 but does not include a sixth aircraft 1014, a seventh aircraft 1016 and an eighth aircraft 1018.

Figure 11:
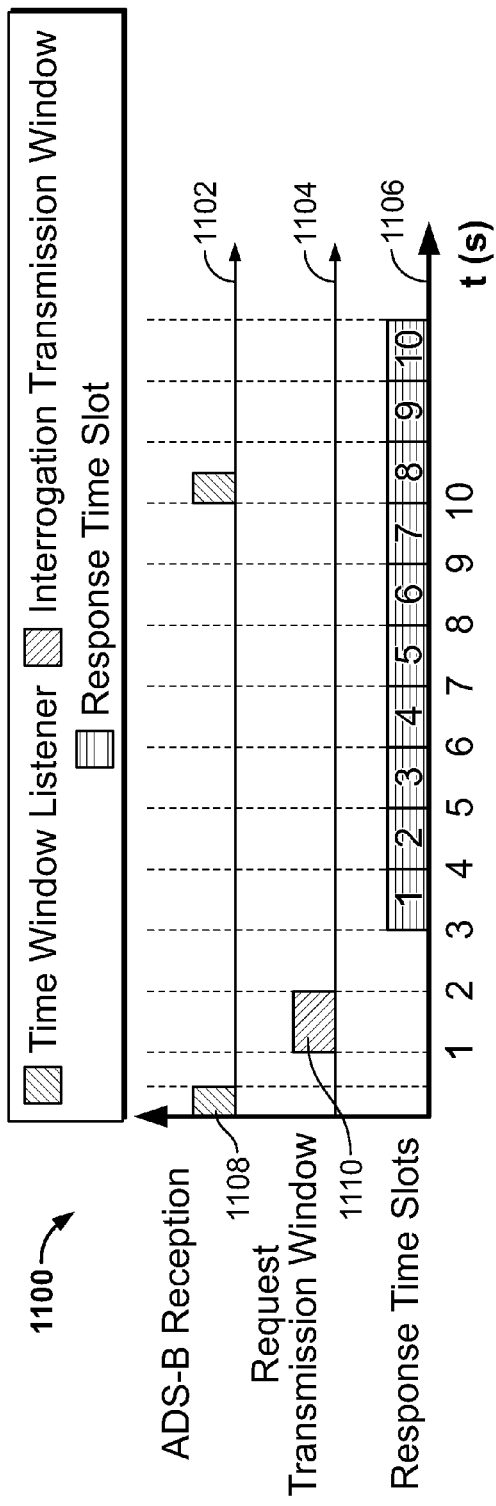
FIG. 11 is an example graph of results obtained using the examples disclosed herein.

FIG. 11 illustrates an example graph 1100 representing a self-assignment response time slot including a first x-axis 1102, a second x-axis 1104 and a third x-axis 1106. In the illustrated example, the first x-axis 1102 includes a time window 1108 of approximately 500 ms for an aircraft to listen for requests and/or receive messages (e.g., ADS-B messages) from other aircraft. In the illustrated, the second x-axis 1104 includes a time window 1110 for the issuance of requests and is disposed between the one second position and the two second position. In the illustrated example, after the third second position, the aircraft within the range of the requesting aircraft begin to transmit responses to the request from the requesting aircraft. In some examples, because one row of AMLAT data may be transmitted at a time, a first row of AMLAT data from each transmitting aircraft is transmitted between the third second position and the fourth second position, a second row of AMLAT data from each transmitting aircraft is transmitted between the fourth second position and the fifth second position, a third row of AMLAT data from each transmitting aircraft is transmitted between the sixth second position and the seventh second position, etc.

Figure 12:
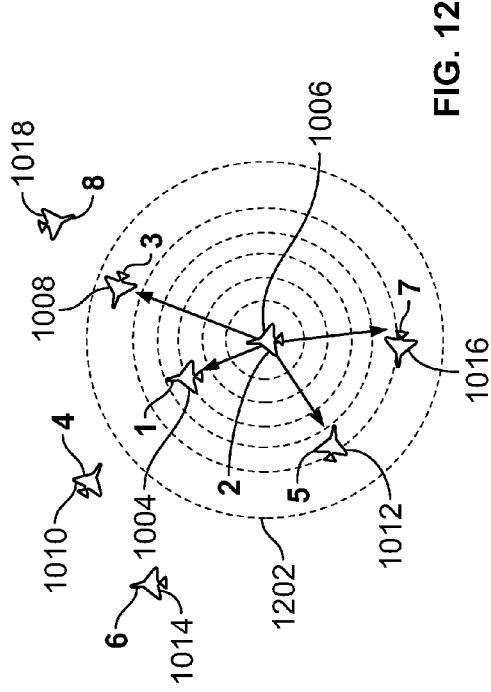
FIG. 12 illustrates an example second aircraft broadcasting responses including multilateration data to aircraft within a range of the second aircraft.

FIG. 12 illustrates the second aircraft 1006 broadcasting a response within a range 1202 of the second aircraft 1006 where the range 1202 includes the first aircraft 1004, the third aircraft 1008, the fifth aircraft 1012 and the seventh aircraft 1016 but does not include the fourth aircraft 1010, the sixth aircraft 1014 and the eighth aircraft 1018.

Figure 13:
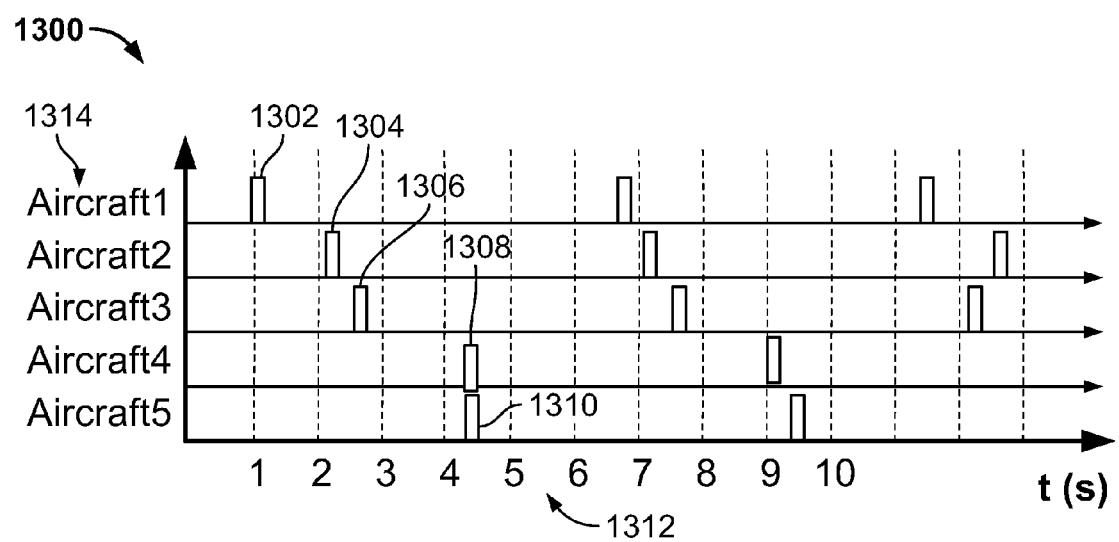
FIG. 13 illustrates an example graph including an example coordination process for broadcasting multilateration data in each time slot.

FIG. 13 illustrates an example table 1300 showing time slots selected by the respective aircraft 202, 204, 206, 208, 210 to transmit replies 1302, 1304, 1306, 1308, 1310, etc. to data requests received. In some examples, the aircraft 202, 204, 206, 208, 210 randomly select a time slot to transmit data to substantially ensure that data is not transmitted by more than one of the aircraft 202, 204, 206, 208, 210 within the group at a time, for example. In the illustrated example, the x-axis 1312 correspond to time and the y-axis 1314 identifies the corresponding aircraft 202, 204, 206, 208, 210.

FIG. 14 illustrates a table 1400 of airborne multilateration data received by the first aircraft 202 including a first row 1402 associated with the second aircraft 204, a second row 1404 associated with the third aircraft 206, a third row 1406 associated with the fourth aircraft 208 and a fourth row 1306 associated with the fifth aircraft 210. The table 1400 includes a first column 1410 including an aircraft ID (e.g., the second aircraft 204, the third aircraft 206, etc.), a second column 1412 including positional information relating to the aircraft identified in the first column 1402, a third column 1414 including a timestamp and a fourth column 1416 indicating whether or not the information within the corresponding first, second and/or third columns 1410, 1412, 1414 has been verified and/or whether the information, if verified, is truthful. In the table 1400, the subscript in the timestamp data of the third column 1414 corresponds to the aircraft providing the AMLAT data and the superscript relates to the aircraft on which the AMLAT data corresponds.

FIG. 15 illustrates an example range 1502 of an example first aircraft 1504 as including a second aircraft 1506, a third aircraft 1508, a fourth aircraft 1510, a fifth aircraft 1512 and not including a sixth aircraft 1514, a seventh aircraft 1516 and an eighth aircraft 1518. FIG. 16 illustrates an example range 1602 of the second aircraft 1506 as including the first aircraft 1504, the third aircraft 1508, the fifth aircraft 1512 and the seventh aircraft 1516 and not including the fourth aircraft 1510 and the eighth aircraft 1518. FIG. 17 illustrates an example range 1702 of the fifth aircraft 1512 as including the first aircraft 1504, the second aircraft 1506, and the seventh aircraft 1516 and not including the third aircraft 1508, the fourth aircraft 1510, the sixth aircraft 1514 and the eighth aircraft 1518.

Figure 18:
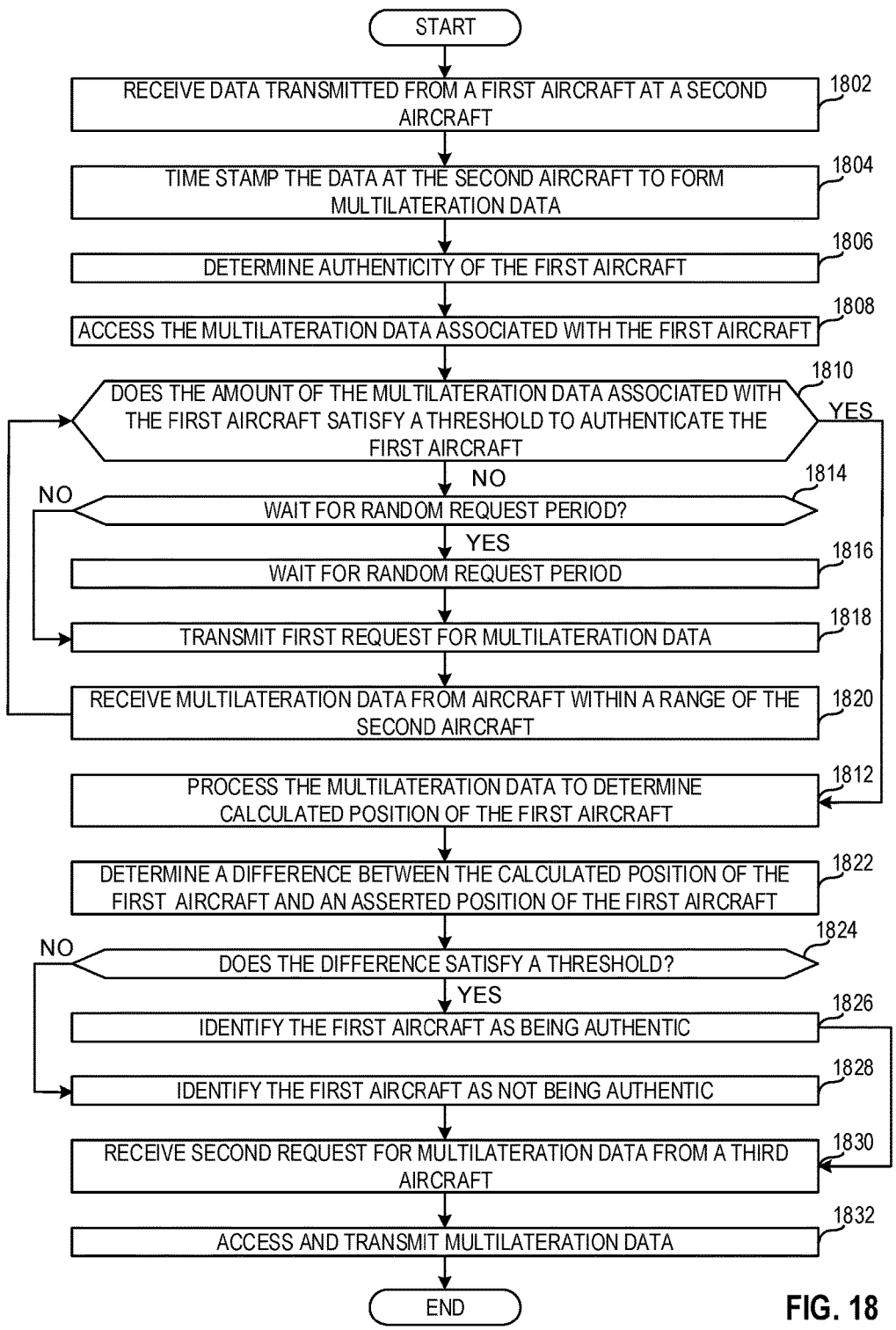
FIG. 18 is a flowchart representative of a method that may executed to implement the example airborne multilateration systems disclosed herein including the example multilateration systems of FIGS. 2 and 3.

A flowchart representative of an example methods for implementing the airborne multilateration systems of FIGS. 2 and 3 is shown in FIG. 18. In this example, the method may be implemented using machine readable instructions that comprise a program for execution by a processor such as the processor 1912 shown in the example processor platform 1900 discussed below in connection with FIG. 19. The program may be embodied in software stored on a tangible computer readable storage medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowchart illustrated in FIG. 4, many other methods of implementing the example airborne multilateration systems 203, 205, 207, 209, 211, 213, 215, 217 may alternatively be used. For example, the order of execution of the blocks may be changed, and/or some of the blocks described may be changed, eliminated, or combined.

As mentioned above, the example method of FIG. 18 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The method of FIG. 18 begins by a second aircraft receiving data transmitted from a first aircraft (block 1802) by, for example, the transmitter of the first aircraft transmitting data including an aircraft identification and positional information that is received by the receiver of the second aircraft. The data is time stamped at the second aircraft to form multilateration data (block 1804) by, for example, the time stamper of the second aircraft time stamps the data to form the multilateration data and stores the multilateration data in a database. The method then determines the authenticity of the first aircraft (block 1806) by, for example, the processor of the second aircraft determining to determine the authenticity of the first aircraft. The multilateration data associated with the first aircraft is accessed (block 1808) by, for example, the TDOA determiner and/or the processor of the second aircraft accessing the multilateration data associated with the first aircraft.

The method then determines if an amount of multilateration data associated with the first aircraft satisfies a threshold to authenticate the first aircraft (block 1810) by, for example, the TDOA determiner and/or the processor of the second aircraft tallying the number of entries relating to the first aircraft and determining if the number is equal to or greater than four. However, the number may be any other number (e.g., 5 entries, 3 entries, etc.).

If the amount of multilateration data associated with the first aircraft satisfies the threshold, the method processes the multilateration data to determine a calculated position of the first aircraft (block 1812) by, for example, the TDOA determiner and/or the processor of the second aircraft processing the multilateration data to determine a calculated position of the first aircraft. However, if the amount of multilateration data associated with the first aircraft does not satisfy the threshold, the process determines whether or not to wait for a random request period (block 1814) by, for example, the random request delayer of the second aircraft determining to delay the transmission of a request. If the method waits for the random request period, the method waits for the random request period (block 1816) by, for example, the random request delayer of the second aircraft causing the requester of the second aircraft to delay the transmission of a multilateration data request for a particular amount of time.

The method then transmits a first request for multilateration data (block 1818) by, for example, the requester of the second aircraft transmitting a request to surrounding aircraft for multilateration data. In response to the first request, the first aircraft receives multilateration data from aircraft within a range of the first aircraft (block 1820) by, for example, the receiver of the second aircraft receiving multilateration data transmitted by the first aircraft, the third aircraft, the fourth aircraft, etc.

The process determines a difference between the calculated position of the first aircraft and an asserted position of the first aircraft (block 1822) by, for example, the TDOA determiner and/or the processor of the second aircraft comparing the calculated and asserted positions of first aircraft to identify a difference. The process determines if the difference satisfies a threshold (block 1824) by, for example, the TDOA determiner and/or the processor of the second aircraft comparing the difference determined to a value and/or range of values stored at the database of the second aircraft.

If the difference is determined as satisfying the threshold, the first aircraft is identified as being authentic (block 1826) by, for example, the TDOA determiner and/or the processor of the second aircraft associating the multilateration data associated with the first aircraft as being verified and/or being authentic. If the difference is determined as not satisfying the threshold, the first aircraft is identified as not being authentic (block 1828) by, for example, the TDOA determiner and/or the processor of the second aircraft associating the multilateration data associated with the first aircraft as being verified and not being authentic.

The process receives a second request for multilateration data (block 1830) by, for example, the receiver of the second aircraft receiving a multilateration data request from a third aircraft. Multilateration data is accessed and transmitted (block 1832) by, for example, the processor of the second aircraft accessing the database for multilateration data and the transmitter of the second aircraft transmitting the multilateration data available.

Figure 19:
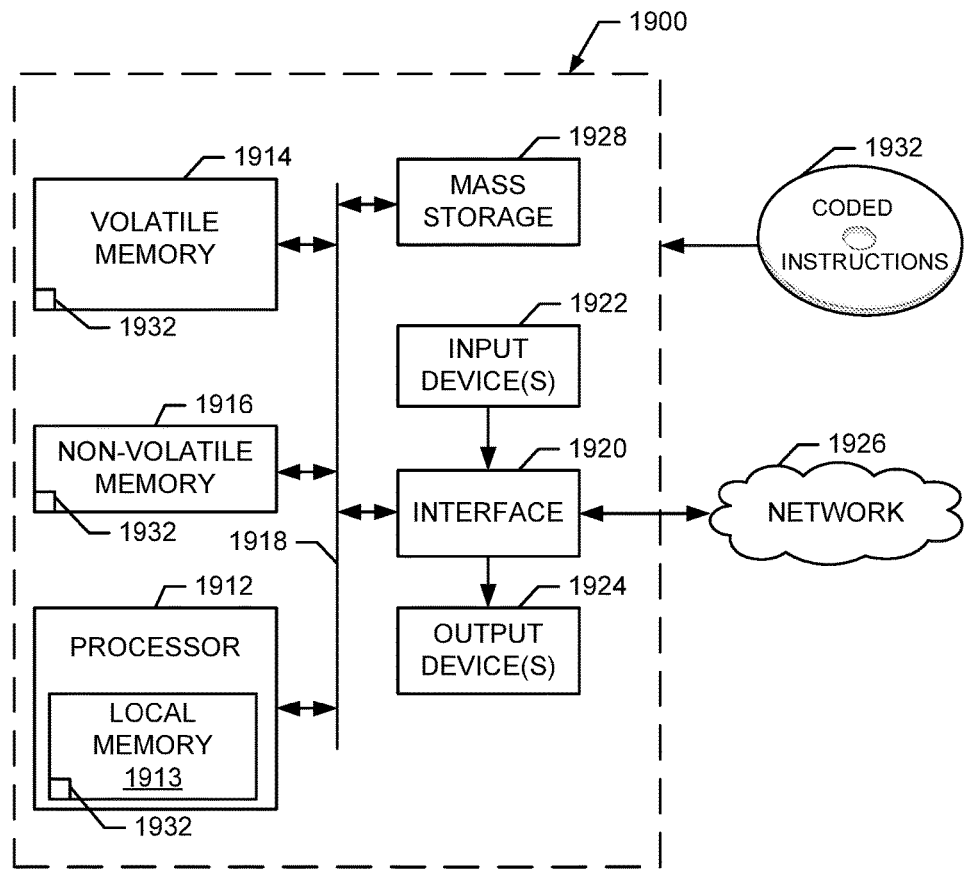
FIG. 19 is a processor platform to perform the method of FIG. 18 to implement the example airborne multilateration systems disclosed herein including the example multilateration systems of FIGS. 2 and 3.

FIG. 19 is a block diagram of an example processor platform 1900 capable of executing the instructions of FIG. 18 to implement the apparatus of FIGS. 2 and 3. The processor platform 1900 can be, for example, a server, a personal computer, a mobile device (e.g., a cell phone, a smart phone, a tablet such as an iPad™), a personal digital assistant (PDA), an Internet appliance, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1920 of the illustrated example, thus, typically includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.).

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID systems, and digital versatile disk (DVD) drives.

Coded instructions 1932 to implement the method of FIG. 18 may be stored in the mass storage device 1978, in the volatile memory 1914, in the non-volatile memory 1916, and/or on a removable tangible computer readable storage medium such as a CD or DVD.

From the foregoing, it will be appreciated that the above disclosed methods, apparatus and articles of manufacture relate to airborne multilateration systems that may use ADS-B messages and/or surveillance technologies to monitor traffic with high precision. In some examples, the ADS-B systems include subsystems including an ADS-B Out and an ADS-B In. The ADS-B out may broadcast information about each aircraft and/or the associated aircraft including an aircraft ID and/or a position of the aircraft. The ADS-B In may enable an aircraft to receive and/or display the ADS-B Out of another aircraft and/or other services such as, for example, Automated Dependent Surveillance Rebroadcast (ADS-R), Traffic Information Service Broadcast (TIS-B) and/or Flight Information Service Broadcast (FIS-B).

The examples disclosed herein relate to methods and apparatus for communicating airborne multilateration information among aircraft as a communication protocol. The examples disclosed herein relate to a lightweight peer-to-peer communications protocol that uses an airborne multilateration. The examples disclosed herein relate to using the communications protocol to enable the detection of ADS-B spoofing. In some examples, ground-based multilateration is used to add accuracy to the ADS-B position data (based on GNNS) received at the ground from aircraft. In some examples, airborne multilateration ADS-B IN equipped aircraft are used in place of the ground-based stations and, thus, become multilateration stations themselves. The examples disclosed herein enable aircraft to detect spoofing attacks by confirming the claimed position of surrounding ADS-B OUT received signals. The examples disclosed herein relate to requesting information from surrounding aircraft and/or responding to such requests to enable the efficient confirmation of the position of suspicious signals (e.g., signals associated with non-authentic aircraft) while optimizing the use of the communication channel bandwidth.

The examples disclosed herein relate to a method of communicating airborne multilateration information (AMLAT), that may be used to increase the ability to detect fraudulent usage ADS-B messages and/or protocol, to increase the reliability of ADS-B messages and/or increase the safety in using the ADS-B protocol, for example. The examples disclosed herein enable increasing the usage of and/or optimizing the usage of the communication channel bandwidth.

The examples disclosed herein relate to airborne multilateration (AMLAT) systems that may be used to authenticate the position of an aircraft and/or authenticate data contained in communication, navigation and surveillance (CNS) system messages and/or messages sent using the Automatic Dependent Surveillance-Broadcast (ADS-B) protocols. The examples disclosed herein relate to a lightweight peer-to-peer communication protocol that may be used to verify the authenticity of data received relating to the position of an aircraft. For example, the example peer-to-peer communication protocol includes details on how information is exchanged between aircraft including the communication channel to be used and/or how to deter communication delays and/or adverse effects when a 1090ES is used as the communication channel. While the 1090ES may be a communication channel when implementing the examples disclosed herein, other communication channel(s) may alternatively be used. In some examples, the examples disclosed herein do not use "datalink" as the mode to exchange information. The examples disclosed herein relate to example airborne multilateration systems that may operate autonomously and independent of a ground-based stations and/or systems.

In some examples, the examples disclosed herein relate to communicating airborne multilateration information among aircraft that include a communication system such as, for example, an Automated Dependent Surveillance Broadcast (ADS-B) system. In some examples, aircraft including an example ADS-B system broadcast and/or transmit messages and/or data including an aircraft identification (aircraft ID) and a position (e.g., a global navigation satellite system (GNSS)) position of the aircraft. In some examples, the aircraft including an example ADS-B system receive messages and/or data from other aircraft where the messages include the aircraft identification (aircraft ID) and the position (e.g., a global navigation satellite system (GNSS)) of the associated aircraft. In some examples, the ADS-B system of an aircraft may have a range within which the aircraft may exchange data with other aircraft. While the range of the example ADS-B system may vary, the range may be approximately 120 nautical miles.

In some examples, a first aircraft may define a group around itself based on the range of the ADS-B system where the group includes other aircraft within the range of the first aircraft. In some examples, the aircraft within the group transmit data including an aircraft ID and the position of the aircraft. The data received by other aircraft within the group is time stamped for a time window to generate multilateration data. In some examples, the data received is parsed to extract the aircraft ID and positional information and time stamped to generate the multilateration data for each of the aircraft. In some examples, the multilateration data for each of the aircraft is stored in a data base of the respective aircraft.

In some examples, to determine the authenticity of a second aircraft within the group, the first aircraft determines if a sufficient amount of data for the second aircraft has been obtained to verify the authenticity of the second aircraft. In some examples, the authenticity of the second aircraft may be determined when the first aircraft includes four time stamps and associated data for the second aircraft within the time window.

If the first aircraft has a sufficient amount of data to verify the authenticity of the second aircraft, in some examples, the first aircraft performs multilateration calculations to calculate a determined position of the second aircraft and then compares the determined position to an asserted position of the second aircraft to determine if the determined and asserted positions are within a threshold of one another.

However, if the first aircraft does not have a sufficient amount of data to verify the authenticity of the second aircraft, in some examples, the first aircraft broadcasts a request to the aircraft within the group for information within a time window relating the second aircraft being authenticated and/or for information within the time window and/or any time window relating the aircraft within the group and/or aircraft that they have multilateration data relating to. In some examples, after receiving the request from the first aircraft, the aircraft within the group transmit data including, for example, the aircraft ID and the ADS-B message received for the time window (TW$_n$). In some examples, to substantially ensure that data requests from the aircraft within the group are not substantially simultaneously submitted, the first aircraft may wait a particular amount of time prior to the first aircraft broadcasting the request to ensure that no other aircraft within the group is transmitting a request.

The examples disclosed herein relate to verifying multilateration information among aircraft and/or among aircraft within the group by, for example, performing multilateration calculations on the multilateration data for each aircraft to determine the authenticity of the aircraft. In some examples, the first aircraft may determine the authenticity of the second aircraft by determining a position of the second aircraft using, for example, the positional information and time stamp associated with the second aircraft and received from other aircraft within the group. In some examples, the first aircraft compares the determined position of the second aircraft and an asserted position of the second aircraft to determine if the determined and asserted positions are within a threshold of one another. When the determined and asserted positions are within a threshold of one another, the first aircraft may deem the second aircraft as being authentic. However, when the determined and asserted position are outside of a threshold of one another, the first aircraft may deem the second aircraft as not being authentic.

An example method for communicating airborne multilateration information among aircraft provided with ADS-B systems that periodically broadcast ADS-B messages containing ADS-B data, said ADS-B data comprising at least an Aircraft ID and a GNSS position, for a predetermined range, the method comprising: defining at least one group, each group being defined as all aircraft within ADS-B range of a particular aircraft; processing, by each aircraft in the group, multilateration data of all aircraft in the group; the multilateration data being the ADS-B data combined with a timestamp for a determined time window; determining, by each aircraft in the group, if there are at least four timestamps per each Aircraft ID for the determined time window, for applying multilateration calculations in order to verify each aircraft in the group; if yes, continuing at the step i) for a next time window; if no, continuing at the next step; issuing a broadcast request to each aircraft in the group if there is no request received from other aircraft in the group during a random request delay; sequentially broadcasting the aircraft ID and the time stamp for each ADS-B message received during the determined time window (TW$_n$) and for each aircraft in the group by each aircraft in the group; and, receiving, by each aircraft in the group, the aircraft ID and the timestamp for the determined time window (TW$_n$) from all aircraft in a group.

In some examples, the method includes listening during determined time windows to the ADS-B messages from aircraft under the ADS-B range; extracting (S22) ADS-B data from the ADS-B message and adding the timestamp to each ADS-B data thus forming the multilateration data; and, storing multilateration data for each time window in a database by each aircraft in the group.

In some examples, the method includes enabling ADS-B systems to be communicated among the ADS-B systems for verifying airborne multilateration information. In some examples, the method includes a peer to peer communications protocol. In some examples, the method includes a peer to peer communications protocol to enable the detection of ADS-B spoofing by means of airborne multilateration.

An example computer readable medium having stored therein a computer program that when loaded onto ADS-B systems, configures the ADS-B systems to enable communication among said ADS-B systems according to the method described in the examples disclosed herein for verifying airborne multilateration information. In one or more examples, the method is configured to be disabled in areas with a high density of nodes.

In some examples, the examples disclosed herein use a common time reference having an accuracy to perform multilateration calculations. While other time references may be used, the examples disclosed herein may use the Global Navigation Satellite System (GNSS) as a time reference.

An example method includes accessing multilateration data relating to a first aircraft using a time-difference-of-arrival determiner of a second aircraft; processing the multilateration data at the second aircraft to determine a calculated position of the first aircraft; comparing the calculated position of the first aircraft to an asserted position of the first aircraft stored at the second aircraft; and in response to the comparison, determining if the calculated position and the asserted position are within a threshold of one another using the time-difference-of-arrival determiner of the second aircraft to determine an authenticity of the first aircraft.

In some examples, the method includes prior to accessing the multilateration data, determining at the second aircraft if a quantity of the multilateration data satisfies a threshold. In some examples, the method includes in response to the quantity of the multilateration data not satisfying the threshold, transmitting a multilateration data request from the second aircraft to aircraft within a range of the second aircraft, where the range includes the first aircraft.

In some examples, the multilateration data request is a first multilateration data request, and prior to transmitting the first multilateration data request, waiting for a time period to deter the first multilateration data request from interfering with a second multilateration data request. In some examples, the multilateration data includes first multilateration data, and further including receiving a response from a third aircraft including second multilateration data. In some examples, the first and second multilateration data correspond to a time window. In some examples, the processing of the multilateration data at the second aircraft includes processing the first and second multilateration data to determine the calculated position of the first aircraft. In some examples the multilateration data includes first multilateration data, and further including: receiving transmitted data from the first aircraft at the second aircraft, the transmitted data including an aircraft identification and positional information; and time stamping the transmitted data at the second aircraft to form second multilateration data.

In some examples, the processing of the multilateration data at the second aircraft includes processing the first and second multilateration data to determine the calculated position of the first aircraft. In some examples, the method includes identifying the first aircraft as being authenticate in response to determining that the calculated position is within the threshold of the asserted position. In some examples, the method includes identifying the first aircraft as not being authenticate in response to determining that the calculated position is outside of the threshold of the asserted position. In some examples, the method includes receiving a multilateration data request at the second aircraft from the first aircraft, and transmitting the multilateration data in response to the multilateration data request.

An example apparatus includes a database of a first aircraft storing multilateration data, the multilateration data associated with a second aircraft; a processor to access the multilateration data, the processor to: process the multilateration data using a time-difference-of-arrival determiner of the processor to determine a calculated position of the second aircraft; compare the calculated position of the second aircraft to an asserted position of the second aircraft; and in response to the comparison, determine if the calculated position is within a threshold of the asserted position to determine an authenticity of the second aircraft. In some examples, the processor is to determine if a quantity of the multilateration data satisfies a threshold to determine the authenticity of the second aircraft. In some examples, the apparatus includes a requester to transmit a multilateration data request from the first aircraft to aircraft within a range of the first aircraft in response to the quantity of the multilateration data not satisfying the threshold.

In some examples, the multilateration data request is a first multilateration data request, and further including a random request delayer to delay the transmission of the multilateration data request for a time period to deter the first multilateration data request from interfering with a second multilateration data request. In some examples, the multilateration data includes first multilateration data, further including a receiver to receive a response from a third aircraft including second multilateration data. In some examples, the processor is to process the first multilateration data and the second multilateration data using the time-difference-of-arrival determiner to determine the calculated position of the second aircraft.

An example article of manufacture comprising instructions that, when executed, cause a machine to at least: access multilateration data relating to a first aircraft at a second aircraft; process the multilateration data at the second aircraft to determine a calculated position of the first aircraft; compare the calculated position of the first aircraft to an asserted position of the first aircraft stored at the second aircraft; and in response to the comparison, determine if the calculated position and the asserted position are within a threshold of one another to determine an authenticity of the first aircraft.

An example method includes receiving a message from a first aircraft at a second aircraft, the message including an aircraft identification of the first aircraft and an asserted position of the first aircraft; time stamping the message to form first multilateration data associated with the first aircraft; storing the first multilateration data in a database at the second aircraft; receiving second multilateration data from a third aircraft in response to transmitting a multilateration data request; storing the second multilateration data in the database at the second aircraft; associating the first multilateration data and the second multilateration data in response to the first and second multilateration data being associated with a time period and the first aircraft; determining a calculated position of the first aircraft at the second aircraft based on the first multilateration data and the second multilateration data; and identifying the first aircraft as not being authenticate in response to the asserted position and the calculated position being outside of a threshold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
accessing multilateration data relating to a first aircraft using a time-difference-of-arrival determiner of a second aircraft;
processing the multilateration data at the second aircraft to determine a calculated position of the first aircraft;
comparing the calculated position of the first aircraft to an asserted position of the first aircraft stored at the second aircraft; and
in response to the comparison, determining if the calculated position and the asserted position are within a threshold of one another using the time-difference-of-arrival determiner of the second aircraft to determine an authenticity of the first aircraft.

2. The method of claim 1, further including, prior to accessing the multilateration data, determining at the second aircraft if a quantity of the multilateration data satisfies a threshold.

3. The method of claim 2, further including, in response to the quantity of the multilateration data not satisfying the threshold, transmitting a multilateration data request from the second aircraft to aircraft within a range of the second aircraft, where the range includes the first aircraft.

4. The method of claim 3, wherein the multilateration data request is a first multilateration data request, and prior to transmitting the first multilateration data request, waiting for a time period to deter the first multilateration data request from interfering with a second multilateration data request.

5. The method of claim 3, wherein the multilateration data includes first multilateration data, and further including receiving a response from a third aircraft including second multilateration data.

6. The method of claim 5, wherein the first and second multilateration data correspond to a time window.

7. The method of claim 5, wherein the processing of the multilateration data at the second aircraft includes processing the first and second multilateration data to determine the calculated position of the first aircraft.

8. The method of claim 1, wherein the multilateration data includes first multilateration data, and further including:
  receiving transmitted data from the first aircraft at the second aircraft, the transmitted data including an aircraft identification and positional information; and
  time stamping the transmitted data at the second aircraft to form second multilateration data.

9. The method of claim 8, wherein the processing of the multilateration data at the second aircraft includes processing the first and second multilateration data to determine the calculated position of the first aircraft.

10. The method of claim 1, further including identifying the first aircraft as being authenticate in response to determining that the calculated position is within the threshold of the asserted position.

11. The method of claim 1, further including identifying the first aircraft as not being authenticate in response to determining that the calculated position is outside of the threshold of the asserted position.

12. The method of claim 1, further including receiving a multilateration data request at the second aircraft from the first aircraft, and transmitting the multilateration data in response to the multilateration data request.

13. The method of claim 1, wherein when the first aircraft is determined to be non-authentic, identifying the first aircraft as a potential malicious aircraft or a potential untruthful aircraft.

14. An apparatus, comprising:
  a database of a first aircraft storing multilateration data, the multilateration data associated with a second aircraft;
  a processor to access the multilateration data, the processor to:
    process the multilateration data using a time-difference-of-arrival determiner of the processor to determine a calculated position of the second aircraft;
    compare the calculated position of the second aircraft to an asserted position of the second aircraft; and
    in response to the comparison, determine if the calculated position is within a threshold of the asserted position to determine an authenticity of the second aircraft.

15. The apparatus of claim 14, wherein the processor is to determine if a quantity of the multilateration data satisfies a threshold to determine the authenticity of the second aircraft.

16. The apparatus of claim 15, further including a requester to transmit a multilateration data request from the first aircraft to aircraft within a range of the first aircraft in response to the quantity of the multilateration data not satisfying the threshold.

17. The apparatus of claim 16, wherein the multilateration data request is a first multilateration data request, and further including a random request delayer to delay the transmission of the multilateration data request for a time period to deter the first multilateration data request from interfering with a second multilateration data request.

18. The apparatus of claim 16, wherein the multilateration data includes first multilateration data, further including a receiver to receive a response from a third aircraft including second multilateration data.

19. The apparatus of claim 18, wherein the processor is to process the first multilateration data and the second multilateration data using the time-difference-of-arrival determiner to determine the calculated position of the second aircraft.

20. An article of manufacture comprising instructions that, when executed, cause a machine to at least:
  access multilateration data relating to a first aircraft at a second aircraft;
  process the multilateration data at the second aircraft to determine a calculated position of the first aircraft;
  compare the calculated position of the first aircraft to an asserted position of the first aircraft stored at the second aircraft; and
  in response to the comparison, determine if the calculated position and the asserted position are within a threshold of one another to determine an authenticity of the first aircraft.

21. A method, comprising:
  receiving a message from a first aircraft at a second aircraft, the message including an aircraft identification of the first aircraft and an asserted position of the first aircraft;
  time stamping the message to form first multilateration data associated with the first aircraft;
  storing the first multilateration data in a database at the second aircraft;
  receiving second multilateration data from a third aircraft in response to transmitting a multilateration data request;
  storing the second multilateration data in the database at the second aircraft;
  associating the first multilateration data and the second multilateration data in response to the first and second multilateration data being associated with a time period and the first aircraft;
  determining a calculated position of the first aircraft at the second aircraft based on the first multilateration data and the second multilateration data; and
    identifying the first aircraft as not being authenticate in response to the asserted position and the calculated position being outside of a threshold.

* * * * *